US006855793B2

(12) United States Patent
Harris et al.

(10) Patent No.: US 6,855,793 B2
(45) Date of Patent: *Feb. 15, 2005

(54) GOLF BALLS WITH THERMOPLASTIC POLYCARBONATE-URETHANE COPOLYMERS

(75) Inventors: Kevin M Harris, New Bedford, MA (US); Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 64 days.

This patent is subject to a terminal disclaimer.

(21) Appl. No.: 10/277,153

(22) Filed: Oct. 21, 2002

(65) Prior Publication Data

US 2003/0078341 A1 Apr. 24, 2003

Related U.S. Application Data

(60) Provisional application No. 60/346,166, filed on Oct. 22, 2001.

(51) Int. Cl.⁷ ........................... A63B 37/12; C08G 18/44
(52) U.S. Cl. ............................. 528/28; 528/76; 528/85; 473/354; 473/365; 473/371; 473/374; 473/377; 473/378
(58) Field of Search .................. 528/28, 76, 85; 473/354, 365, 371, 374, 377, 378

(56) References Cited

U.S. PATENT DOCUMENTS

| | | | |
|---|---|---|---|
| 4,675,361 A | 6/1987 | Ward, Jr. ..................... 525/92 |
| 4,978,691 A * | 12/1990 | Murai et al. ................. 521/172 |
| 5,221,724 A | 6/1993 | Li et al. ........................ 528/28 |
| 5,428,123 A | 6/1995 | Ward et al. ................... 128/28 |
| 5,461,134 A | 10/1995 | Leir et al. ..................... 528/14 |
| 5,530,083 A | 6/1996 | Phelps et al. ................. 528/25 |
| 5,589,563 A | 12/1996 | Ward et al. ................... 528/44 |
| 5,863,627 A | 1/1999 | Szycher et al. ............ 428/36.8 |
| 5,976,035 A | 11/1999 | Umezawa et al. .......... 473/364 |
| 6,126,558 A * | 10/2000 | Higuchi et al. ............. 473/374 |
| 6,159,110 A | 12/2000 | Sullivan et al. ............. 473/374 |
| 6,162,134 A | 12/2000 | Sullivan et al. ............. 473/373 |
| 6,204,331 B1 | 3/2001 | Sullivan et al. ............. 525/221 |
| 6,207,784 B1 | 3/2001 | Rajagopalan ................ 528/71 |
| 6,251,991 B1 * | 6/2001 | Takesue et al. ............... 525/66 |
| 6,663,507 B1 * | 12/2003 | Watanabe et al. ........... 473/373 |
| 6,737,498 B2 * | 5/2004 | Harris et al. .................. 528/85 |
| 2002/0016435 A1 * | 2/2002 | Simonutti et al. ............ 528/59 |
| 2003/0073515 A1 * | 4/2003 | Yokota ....................... 473/378 |
| 2003/0078342 A1 * | 4/2003 | Harris et al. .................. 525/91 |

OTHER PUBLICATIONS

Thain, Science and Golf IV, p. 319–327; Jul. 2002.*

* cited by examiner

*Primary Examiner*—David J. Buttner
(74) *Attorney, Agent, or Firm*—D. Michaels Burns

(57) ABSTRACT

A golf ball comprising a core, a cover, and, optionally, at least one intermediate layer disposed between the core and the cover, wherein at least one of the cover or the intermediate layer comprise a thermoplastic polycarbonate-urethane copolymer.

20 Claims, 1 Drawing Sheet

GOLF BALLS WITH THERMOPLASTIC POLYCARBONATE-URETHANE COPOLYMERS

CROSS-REFERENCE TO RELATED APPLICATION

Figure 1:
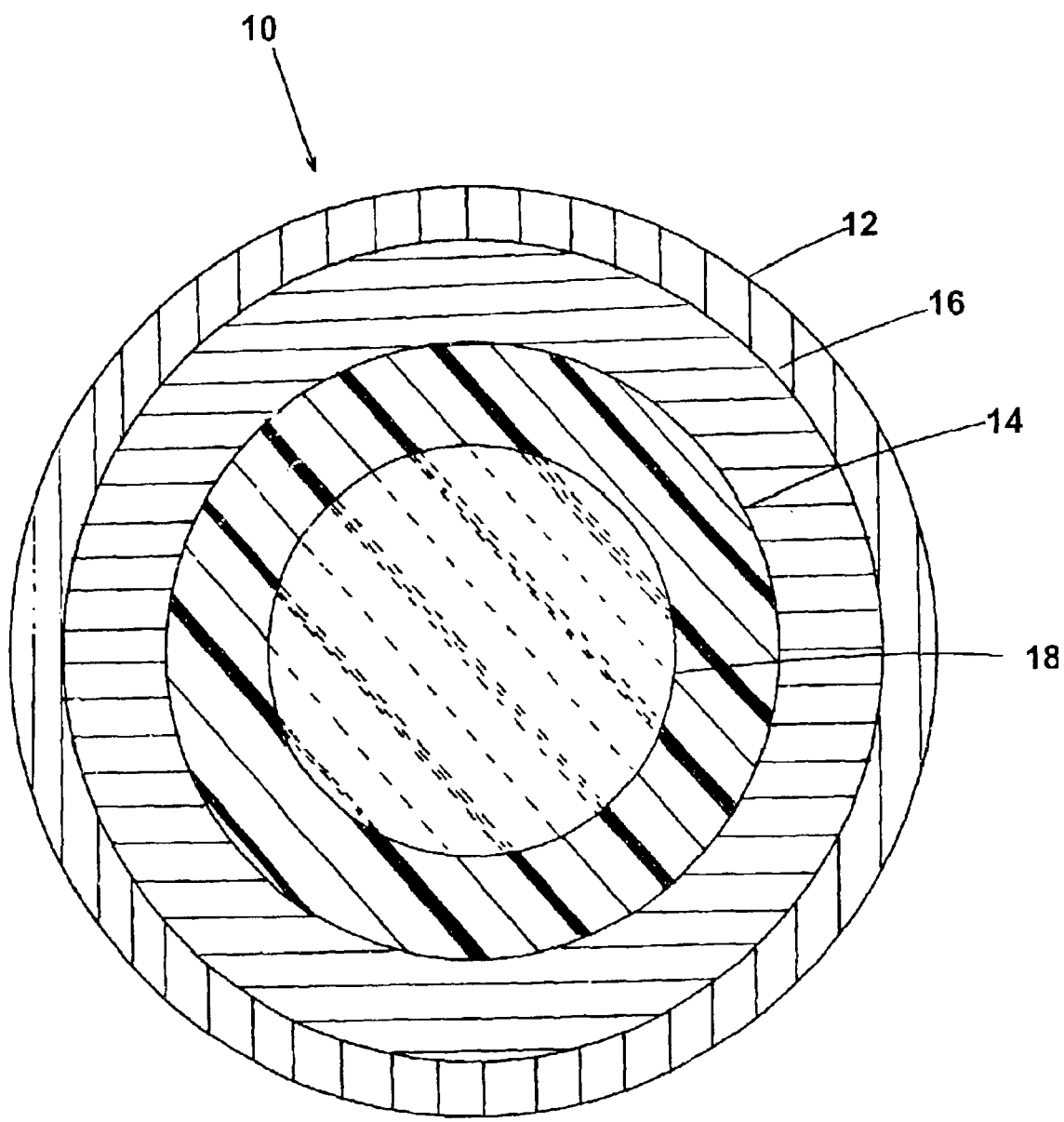

This application claims priority to U.S. Provisional Patent Application No. 60/346,166, filed Oct. 22, 2001.

FIELD OF THE INVENTION

The present invention relates to golf balls and, more specifically, to the use of thermoplastic polycarbonate-urethane copolymers in a golf ball cover, core, or intermediate layers for improving golf ball physical properties.

BACKGROUND OF THE INVENTION

Conventional golf balls can be divided into two general types or groups: solid balls and wound balls. The difference in play characteristics resulting from these different types of constructions can be quite significant.

Conventional golf balls can be divided into two general types or groups: solid balls and wound balls. The difference in play characteristics resulting from these different types of constructions can be quite significant. Balls having a solid construction generally provide a very durable ball while also providing maximum distance. Solid balls are generally made with a solid core (of one or more layers) encased by a cover of at least one layer. Typically, solid cores are made of polybutadiene that are chemically cross-linked with zinc diacrylate (or similar cross-linking agents). The covers are generally a material such as SURLYN®, an ionomer resin produced by DuPont, or, more recently, polyurethane. Such a combination imparts a high initial velocity to the ball that results in improved distance. Because these materials can be very rigid, many two-piece balls have a hard "feel" when struck with a club. Likewise, due to their hardness, these balls can also have a relatively low spin rate, which provides greater distance.

Wound balls typically have either a solid rubber or liquid center core around which many yards of a tensioned elastomeric material are wound and are covered with a durable cover material such as ionomer or polyurethane. Wound balls are generally softer and provide more spin than do solid golf balls. This enables a skilled golfer to have better control over ball flight. Particularly, with approach shots into the green, the high spin rate of soft, wound balls enables the golfer to stop the ball very near its landing position.

The design and technology of golf balls has advanced to the point that the United States Golf Association has instituted a rule prohibiting the use of any golf ball, in a USGA sanctioned event, that can achieve an initial velocity of greater than 255 ft/s when struck by an implement having a velocity of 143 ft/s (referred to hereinafter as "the USGA test").

Manufacturers place a great deal of emphasis on producing golf balls that consistently achieve the highest possible velocity in the USGA test without exceeding the limit, which are available with a range of different properties and characteristics, such as velocity, spin, and compression. Thus, a variety of different balls are available to meet the needs and desires of a wide range of golfers.

Regardless of the construction of the ball, players generally seek a golf ball that delivers maximum distance, which requires a high initial velocity upon impact. Therefore, in an effort to meet the demands of the marketplace, manufacturers strive to produce golf balls with high initial velocities.

As a result, golf ball manufacturers are continually searching for new ways in which to provide golf balls that deliver the maximum performance for golfers at all skill levels, and seek to discover compositions that provide the performance of a high compression ball with lower compression.

The physical characteristics of a golf ball are determined by the combined properties of the core, any intermediate layers, and the cover. These, in turn, are determined by the chemical compositions of each. The composition of some balls will provide for increased distance. Other compositions provide for improved spin. Manufacturers are constantly looking to develop the ideal materials. Thermoplastic polyurethane ureas for example, have been examined for their innate ability to provide material having very high tensile strengths, which is a very desired property in the make-up of a golf ball.

Polycarbonate-urethane elastomers (PCUE) are thermoplastic in nature. That is, they can be processed by methods that involve melting or dissolving the polymer to "re-shape it." The molecular structure of PCUEs generally consists of alternating high-melting "hard" urethane segments and liquid-like "soft" segments. Hard segments are almost always the reaction product of an aromatic or aliphatic diisocyanate and a low molecular weight, chain-extending dialcohol or diol. Soft segments are usually synthesized from (polyether or polycarbonate) polyols with terminal hydroxyl (—OH) groups. The hydroxyl creates a urethane group, while the reaction between isocyanates and existing urethane groups will form allophanate groups that can produce minor amounts of covalent cross-linking. When a PCUE is heated, the hydrogen-bonded hard segments and any allophanate cross-links, both of which hold the polymer together at its use temperature, dissociate to allow the polymer to melt and flow. Dissolution in a polar solvent can also disrupt the hydrogen bonds that hold together the hard segments on adjacent chains. Once these virtual cross-links are broken, the polymer can be fabricated into golf balls. Upon cooling or solvent evaporation, the hard segments de-mix from the soft segments to re-associate by hydrogen bonding. This restores the original mechanical properties of the PCUE.

While conventional polyether and polycarbonate TPUs have high elongation and tensile strength, they also exhibit fairly high moduli. Therefore, there exists a need for a golf ball comprising a thermoplastic polycarbonate elastomer having improved golf ball performance. Therefore, by varying the hard segment of a PCUE during synthesis, a whole family of polymers of related chemistry can be produced having a wide range of hardness, modulus, tensile-strength properties and elongation.

SUMMARY

The invention is related to a use of a polycarbonate-urethane elastomers for forming golf ball components, more particularly, golf ball core, covers, or intermediate layers. A first embodiment is a golf ball comprised of a core and a cover, one of which comprises a urethane hard segment with a polycarbonate-based soft segment to create a thermoplastic polycarbonate-urethane copolymer.

Other embodiments of the invention blend the block copolymer of polycarbonate-urethane with at least one thermoplastic or thermoset polymer, including ionomers and their highly neutralized acid polymers and copolymers; epoxies, styrenic, and olefinic homo and copolymers (including metallocenes and single-site); polyamides; polyesters; polydienes; and block copolymers of polyether (or ester)-ester and polyether (or ester)-amide. Examples of these may be found in U.S. Patents issued to Ward et al. U.S. Pat. Nos. 4,675,361; 5,428,123; 5,589,563; and 5,863,627, which are incorporated by reference herein in their entirety.

The invention is either a two-piece or a multi-layered golf ball having a coefficient of restitution greater than about 0.7 and an Atti compression of at least about 50. In a preferred use of the invention, the PCUE is used for the cover of the golf ball and has a material tensile strength of greater than about 3000 psi.

In another embodiment, at least one of the core, intermediate layer, or cover comprises a thermoplastic polycarbonate-urethane copolymer composition formed from the reaction product of a hydroxyl-terminated polycarbonate, an aromatic diisocyanate, and a low molecular weight glycol used as a chain extender.

Surface-modifying end groups (SMEs) are surface-active oligomers covalently bonded to the PCUE base polymer during synthesis. The invention can include SMEs that will control surface chemistry without compromising the bulk properties of the polymer. Key surface properties, such as abrasion resistance, are permanently enhanced without additional post-fabrication treatments or topical coatings.

BRIEF DESCRIPTION OF THE THE DRAWING

FIG. 1 is a cross-sectional view of a golf ball of the invention.

DETAILED DESCRIPTION OF EMBODIMENTS

The golf ball 10 of the invention comprises a core 14 of at least one layer, a cover 12 of at least one layer being disposed concentrically about the core 14, and may optionally include at least one intermediate layer 16 between the cover 12 and the core 14. Any part of these layers 10 may contain thermoplastic urethane copolymers having polycarbonate in the soft segment of the copolymer. The core 14 may optionally contain a center that is solid, hollow, fluid, or gel filled. The ball may also include a layer formed from a tensioned elastomeric material.

Thermoplastic polycarbonate-urethane copolymers available today include Bionate®. copolymers which are known to show material having good oxidative stability, excellent mechanical strength and abrasion resistance, and that which is very important in golf ball manufacture. Ultimate tensile strengths for Bionate® compounds can exceed 10,000 psi. The ultimate elongation of the present invention is about 20 to 1000% with a preferred elongation of at least about 400 to about 800%. The initial modulus of the present invention is about 300 to 150,000 psi, and preferably between about 10,000 and about 80,000 psi.

U.S. Pat. No. 5,589,563 issued to Ward, describes how commercially-available Bionate® is processed. Bionate® polycabonate-urethane is a thermoplastic elastomer formed as the reaction product of a hydroxyl terminated polycarbonate, an aromatic diisocyanate, and a low molecular weight glycol used as a chain extender. In a preferred embodiment, polycarbonate glycol intermediate, poly (1,6-hexyl-1,2-ethyl carbonate) diol, is the condensation product of 1,6-hexanediol with cyclic ethylene carbonate. The polycarbonate macroglycol is reacted with aromatic isocyanate, 4,4'-methylene bisphenyl diisocyanate, and chain extended with 1,4-butanediol.

A desired quality in the manufacture of golf balls is that polycarbonate-urethanes can be melt processed by conventional extrusion or injection molding equipment. However, they are very hydrophilic and drying procedures must be taken to minimize moisture content to levels as low as 0.01% during processing.

Further compositions may also be added to the thermoplastic polycarbonate-urethane copolymer components of the invention. Such compositions include but are not limited to, SMEs, compatibilizers, coloring agents, reaction enhancers, cross-linking agents, blowing agents, dyes, lubricants, fillers (including density modifying fillers), excipients, process aids and other compounds commonly added to polymeric materials and/or golf ball compositions.

Surface-modifying end groups (SMEs) are surface-active oligomers bonded to the base polymer during synthesis. SMEs, that include silicone, sulfonate, flurocarbon, polyethylene oxide and hydrocarbon groups, control surface chemistry without compromising the bulk properties of the polymer. Key surface properties, such as abrasion resistance, are permanently enhanced without the additional post-fabrication treatments or topical coatings. In addition to excellent tensile strength and abrasion resistance properties, what makes polycarbonate-urethanes attractive materials for use in golf balls is that they can be prepared by coupling end groups to the backbone of the polymer during synthesis via a terminal isocyanate group, not a hard segment. The added mobility of end groups relative to the backbone facilitates the formation of uniform over-layers by the surface-active (end) blocks. The addition of SMEs provides a series of base polymers that can actually achieve a desired surface chemistry without the use of additives. This leaves the original polymer backbone intact so that the polymer retains strength and processing ability. Having all the polymer chains carrying the surface-modifying moiety eliminates many of the potential problems associated with additives.

The composition of any golf ball component, which does not contain thermoplastic polycarbonate-urethane copolymers of the present invention disclosed herein, can be any such composition known to those of ordinary skill in the art. Such a composition may be readily selected by those of ordinary skill in the art.

The resultant golf balls typically have a coefficient of restitution of greater than about 0.7, preferably greater than about 0.75, and more preferably greater than about 0.78, measured at an impact velocity of 125 ft/s. The golf balls also typically have a compression of at least about 40, preferably from about 50 to 120, and more preferably about 60 to 100. As used herein, the term "compression" refers to that measured by an ATTI compression gauge. These gauges are well known to those of ordinary skill in the art and are commercially-available from Atti Engineering Corp. of Union City, N.J.

The present invention relates to golf balls of any size. While USGA specifications limit the size of a competition golf ball to more than 1.68 inches in diameter, golf balls of any size can be used for leisure golf play. The preferred diameter of golf balls is from about 1.68 inches to about 1.76 inches. A diameter of from about 1.68 inches to about 1.74 inches is most preferred. The core of the ball has a diameter from about 1.0 to about 1.62 inches. The cover of the golf balls typically has a thickness of at least about 0.03 inches. The cover of the present invention is preferably 0.02 to 0.125 inches, and more preferably from about 0.03 to 0.10 inches. Golf balls also typically have at least about 60 percent dimple coverage, preferably at least about 70 percent dimple coverage, of the surface area. The cover layer has a Shore D hardness of at least about 20 and preferably between about 30 and about 65. The golf ball of the present invention has a compression of less than about 120.

Golf balls of the present invention can be manufactured by numerous methods. The core may be made by methods well known in the art, by using either a conventional wound core construction, or a conventional solid construction of one or more layers. The wound core construction can be either a solid rubber-based center or a liquid filled center, around which a length of elastic thread is wound. A conventional solid construction preferably comprises a cis-1,4 polybutadiene rubber that has been cross-linked with a metal salt of an unsaturated fatty acid such as zinc diacrylate. A conventional multi-layer construction may include multi-layered cores of different polybutadiene based materials to form inner and outer core layers.

These core constructions are then covered using conventional compression injection molding or casting techniques with a cover formulation containing a thermoplastic polycarbonate-urethane copolymer as discussed above. There are many methods to utilize this material. One non-limiting example includes a layer comprising a copolymer of polycarbonate-polyurethane that is formed over a golf core by a one-shot (or alternately a pre-polymer approach) process. This is done for example, by intimately mixing a soft segment of polycarbonate polyol (PC) with a hard segment of 4,4'-diphenymethane diisocyanate (MDI), ethylene diamine (ED) and 1,3-cyclohexanediamine (CHD), and a typical endgroup, such as dodecylamine (DDA). The covers are preferably between about 0.05 and about 0.10 inches thick.

In another embodiment, the copolymer of polycarbonate-polyurethane is blended with at least one thermoplastic or thermoset polymer, including ionomers and their acid precursors including highly neutralized polymers; polyolefins; polyacrylates; polyamides; polyphenylene oxides; polyisporenes; block copoly (ethers or ester-amides); block copoly (ethers or ester-esters); polysulfones; reaction injection moldable thermoplastic and thermoset polymers; block copolymers of styrene-butadiene and its hydrogenated derivatives; dynamically vulcanized ethylene-propylene rubbers; polyvinylidenefluorides; acrylocnitrile-butadiene styrene copolymers; polyureas; epoxy resins; polystyrenes; acrylics; polyethylenes; polybutadienes; and polyesters.

Another embodiment comprises a core and an inner cover having a flexural modulus greater than about 50,000 psi and a cover comprised of polycarbonate-urethane copolymers. The cover has a thickness of from about 0.02 inches to about 0.05 inches and has initial modulus of less than about 10,000 psi. In another embodiment, the initial modulus is between about 300 psi and about 100,000 psi.

Another embodiment comprises a core, and at least one cover, or one intermediate layer comprising thermoplastic polycarbonate-urethane copolymers. The core preferably has a diameter of at least about 1.0 inch. The intermediate layer preferably has a thickness of about 0.02 inches to about 0.10 inches and the cover preferably has a thickness of less than about 0.1 inch. The polybutadiene rubber composition of the core preferably comprises at least about 2.2 pph of a halogenated organosulfur compound, preferably zinc pentachlorothiophenol or the salt thereof.

While it is apparent that the invention disclosed herein is well calculated to fulfill the objects stated above, it will be appreciated that numerous modifications and embodiments may be devised by those skilled in the art. Such modifications may include density modifying additives, UV absorbing additives, foamed layers, moisture barrier layer, hindered amine light stabilizers, optical brighteners etc. In addition to its use in a golf ball, the present invention can be used in other golf equipment such as inserts in golf clubs. Therefore, it is intended that the appended claims cover all such modifications as falling within the true spirit and scope of the present invention.

What is claimed is:

1. A golf ball comprising:
   a core of at least one layer; and
   a cover of at least one layer disposed concentrically about the core; and
   at least one of the cover or the core comprises a polycarbonate-urethane copolymer having a surface-active oligomer bonded to the base polymer during synthesis,
   wherein desired surface chemistry may be achieved without the use of additives.

2. The golf ball according to claim 1, wherein the polycarbonate-urethane copolymer is formed from the reaction product of a hydroxyl terminated polycarbonate, an aromatic diisocyanate, and a low molecular weight glycol.

3. The golf ball according to claim 1, wherein the polycarbonate-urethane copolymer is blended with at least one thermoplastic or thermoset polymer comprising ionomers and their acid polymers including highly neutralized acid polymers polyurea, polyolefins, polyacrylates, polyamides, polyphenylene oxide, polyisoprene, block copoly (ether or ester-amide), block copoly (ether or ester-ester), polysulfones, reaction injection moldable thermoplastic and thermoset polymers, block copolymer of styrene-butadiene and its hydrogenated derivatives, dynamically vulcanized ethylene-propylene rubber, polyvinylidenefluoride, acrylocnitrile-butadiene styrene copolymer, epoxy resins, polystyrenes, acrylics, polyethylenes, polybutadienes and polyester.

4. The golf ball according to claim 1, wherein the golf ball further comprises at least one intermediate layer disposed between the cover and the core.

5. The golf ball according to claim 4, wherein the intermediate layer comprises a tensioned elastomeric material.

6. The golf ball according to claim 1, wherein the polycarbonate-urethane copolymer has a tensile strength of greater than about 3000 psi.

7. The golf ball according to claim 1, wherein the polycarbonate-urethane copolymer has a Shore D hardness of about 30 to about 65.

8. The golf ball according to claim 1, wherein the polycarbonate-urethane copolymer has an ultimate elongation of about 400 to about 800 percent.

9. The golf ball according to claim 1, wherein the thermoplastic polycarbonate-urethane copolymer has an initial modulus of about 10,000 to about 80,000 psi.

10. A golf ball comprising:
    a core of at least one layer;
    a cover of at least one layer disposed concentrically about the core; and
    at least one intermediate layer disposed between the core and the cover; and
    at least one of the cover or the at least one intermediate layer comprises a polycarbonate-urethane copolymer having a surface-active oligomer bonded to the base polymer during synthesis,
    wherein desired surface chemistry may be achieved without the use of additives.

11. The golf ball according to claim 10, wherein the polycarbonate-urethane copolymer is blended with at least one thermoplastic or thermoset polymer comprising ionomers and their acid polymers including highly neutralized polymers, polyurethane, polyurea, polyolefins, polyacrylates, polyamides, polyphenylene oxide, polyisoprene, block copoly (ether or ester-amide), block copoly (ether or ester-ester), polysulfones, reaction injection moldable thermoplastic and thermoset polymers, block copolymer of styrene-butadiene with its hydrogenated derivatives, dynamically vulcanized ethylene-propylene rubber, polyvinylidenefluoride, acrylocnitrile-butadiene styrene copolymer, epoxy resins, polystyrenes, acrylics, polyothylenes, polybutadienes and polyesters.

12. The golf ball according to claim 10, wherein the thickness of the at least one intermediate layer is about 0.02 inches to about 0.08 inches.

13. The golf ball according to claim 10, wherein the core has a diameter of at least about 1.55 inches.

14. The golf ball according to claim 10, wherein the core comprises a center that is solid, hollow, fluid-filled, or gel-filled.

15. The golf ball of claim 10, wherein the intermediate layer comprises the polycarbonate-urethane copolymer and the cover comprises a thermoplastic material.

16. The golf ball of claim 10, wherein the intermediate layer comprises the polycarbonate-urethane copolymer and the cover comprises a thermoset material.

17. The golf ball according to claim 1, wherein the surface-active oligomer includes polyethylene oxide.

18. The golf ball according to claim 1, wherein the surface-active oligomer includes silicone.

19. The golf ball according to claim 10, wherein the surface-active oligomer includes polyethylene oxide.

20. The golf ball according to claim 10, wherein the surface-active oligomer includes silicone.

* * * * *